United States Patent [19]

Danmoto et al.

[11] Patent Number: 5,357,675
[45] Date of Patent: Oct. 25, 1994

[54] COTTER ASSEMBLING THE METHOD AND COTTER ASSEMBLING APPARATUS

[75] Inventors: Shojiro Danmoto, Edosaki; Takeshi Yakou, Tokyo, both of Japan

[73] Assignee: Canon Kabushiki Kaisha, Tokyo, Japan

[21] Appl. No.: 22,627

[22] Filed: Feb. 25, 1993

[30] Foreign Application Priority Data

Feb. 28, 1992 [JP] Japan ................... 4-043356
Feb. 10, 1993 [JP] Japan ................... 5-022698

[51] Int. Cl.$^5$ ............................................. B23P 15/00
[52] U.S. Cl. ................... 29/888.01; 29/464; 29/888.46
[58] Field of Search .............. 29/888.01, 888.46, 464, 29/777, 997, 809, 213.1, 214

[56] References Cited

U.S. PATENT DOCUMENTS

| | | | |
|---|---|---|---|
| 3,208,133 | 9/1965 | Morton | 29/213.1 |
| 3,793,999 | 2/1974 | Seiler et al. | 29/214 |
| 4,651,396 | 3/1987 | Karlidou | 29/213.1 |
| 4,879,795 | 11/1989 | Nakamura et al. | 29/214 |
| 4,879,796 | 11/1989 | Nakamura et al. | 29/214 |
| 5,086,555 | 2/1992 | Broadway et al. | 29/213.1 |
| 5,097,579 | 3/1992 | Pringault | 29/214 |

FOREIGN PATENT DOCUMENTS

| | | | |
|---|---|---|---|
| 4014471 | 11/1991 | Fed. Rep. of Germany | 29/888.01 |
| 4016546 | 11/1991 | Fed. Rep. of Germany | 29/888.01 |
| 0191528 | 8/1988 | Japan | 29/214 |
| 63-37162 | 10/1988 | Japan | |
| 0267133 | 11/1988 | Japan | 29/214 |

Primary Examiner—Irene Cuda
Attorney, Agent, or Firm—Fitzpatrick, Cella, Harper & Scinto

[57] ABSTRACT

In order to provide an automatic assembling method and apparatus for automatically assembling an assembly consisting of a compression spring, a retainer for holding the compression spring in a compressed state, and cotters for setting the retainer in a holding state so as to cause a shaft member slidably or pivotally arranged in a main body to perform a predetermined operation, the cotters are held in a supply posture state to the shaft member, the retainer is held at a position escaped from a cotter fitting or assembling position of the shaft member against the biasing force of the compression spring, the cotters in the supply posture state are supplied to the cotter assembling position of the shaft member, and the retainer is moved to the cotter assembling position by releasing the biasing force of the compression spring.

12 Claims, 20 Drawing Sheets

COTTER ASSEMBLING THE METHOD AND COTTER ASSEMBLING APPARATUS

BACKGROUND OF THE INVENTION

The present invention relates to a method and apparatus for automatically assembling an assembly consisting of a compression spring, a retainer for holding the compression spring in a compressed state, and a cotter for setting the retainer in a holding state so as to cause a shaft member slidably or pivotally provided to a main body to perform a predetermined operation, and is applied to automatic assembling of members around intake and exhaust valves of a cylinder head block of an engine for a vehicle or an industrial machine, and automatic assembling of frictional clutch members of OA equipment.

Conventionally, an intake or exhaust valve as a shaft member slidably arranged on an engine as a main body is provided with an assembly consisting of a compression spring, a retainer for holding the compression spring in a compressed state, and a cotter for setting the retainer in a holding state so as to close the valve.

The above arrangement will be described below with reference to accompanying drawings. FIG. 1 is a sectional view of a cylinder head portion of an engine taken along a plane passing through a valve, and FIG. 2 is a sectional view showing an assembling state of the cylinder head portion. As shown in FIGS. 1 and 2, a valve guide 10b is inserted under pressure in a valve axial hole 10a of a cylinder head block 10 as a main body, and an intake or exhaust valve 7 is held by the valve guide 10b to extend therethrough. A valve spring 1 as a compression spring for holding a closed state by its compression biasing force is fitted around the upper end portion of the valve 7, and is assembled in an illustrated state using cotters 5 and 6 and a retainer 4 at the upper end of the shaft portion of the valve 7. The above-mentioned assembling method allows assembling without using any fasteners (e.g., screws).

The above-mentioned holding principle will be described below with reference to an explanatory view of FIG. 3. When the valve 7 is slidably held by the cylinder head block 10 as a main body, the valve spring 1 as a compression spring arranged around the upper end portion of the valve 7 is set to have a length shorter than its free length, and generates a biasing force F1 for biasing the valve 7 in a direction to separate from the cylinder head block 10. The biasing force F1 generates a partial force F2 in a direction perpendicular to a tapered surface 4a of the retainer 4, thereby generating a partial force F3 (FIG. 3) in the cotters 5 and 6. The cotters 5 and 6 are respectively formed integrally with projections 5a and 6a each having a shape matching with a recess portion 7a formed on the valve 7, and are set in the illustrated holding state under the effect of the partial force F3.

In the above-mentioned state, the valve 7 is opened/closed by pressing a top portion 7t of the valve 7 downward against the compression force of the valve spring 1.

The above-mentioned assembling work of the cylinder head is an almost manual work (e.g., the cotters 5 and 6 are inserted by letting them to freely drop), resulting in poor workability. In addition, it is not easy to insert the cotters at the predetermined position, resulting in poor productivity. In particular, since recent engines for vehicles tend to have a multi-valve structure, i.e., tend to have four to five valves per cylinder, the complicated structure of the engine head block makes the work more difficult.

As disclosed in Japanese Utility Model Publication No. 63-37162, a valve assembling apparatus for assembling half-divided cotters to a temporary assembly obtained by assembling an intake/exhaust valve, a valve spring, and a retainer to an engine cylinder head is proposed. In this apparatus, cotters are grasped by a chucking pawl unit via a cotter guide member. When the retainer is pushed downward upon downward movement of a retainer pressing member, the cotter guide member is stopped by the upper end of the valve. The cotters are then assembled to the valve by forcibly fitting them by the chucking pawl unit and engaging them with a cotter engaging groove.

In OA equipment, an arrangement wherein a frictional clutch is provided to a paper convey mechanism so as not to apply an over-load to a driving source is known. In this case, the frictional clutch is assembled in advance as an independent member, and this independent member is manually assembled using fasteners, screws, and the like.

SUMMARY OF THE INVENTION

However, the above-mentioned proposal is limited to engine valves, and has poor versatility. In particular, the chucking pawl unit is arranged to be pivotal about a fulcrum, and cannot cope with cotters having different shapes and dimensions. Therefore, the present invention has been made in consideration of the above situation, and has as its object to provide a method and apparatus for automatically assembling a cotter assembly consisting of a compression spring, a retainer for holding the compression spring in a compressed state, and a cotter for setting the retainer in a holding state so as to cause a shaft member slidably or pivotally provided to a main body to perform a predetermined operation, which method and apparatus can give versatility upon grasping of the cotter, and can improve work efficiency.

It is another object of the present invention to attain automatic assembling of an engine head block, in such a manner that a valve spring is maintained in a state applied with a predetermined compression force, cotters are fitted in recess portions provided to a shaft member, and a retainer is assembled to cover the cotters in a centered state in an assembling work of members around a valve of an engine. It is still another object of the present invention to attain automatic assembling of a frictional clutch assembly consisting of a compression spring, a retainer for holding the compression spring in a compressed state, and a cotter for setting the retainer in the holding state so as to provide a frictional clutch function to the retainer provided to a shaft member pivotally arranged on a main body.

In order to achieve the above objects, the present invention comprises the following arrangement. More specifically, there is provided an assembling method comprising the steps of: holding a cotter in a supply posture state of a shaft member; holding a retainer at a position escaped from a cotter fitting position of the shaft member against a biasing force of a spring; supplying the cotter in the supply posture state to a cotter assembling position of the shaft member; and moving the retainer to the cotter assembling position by releasing the biasing force of the spring, thereby solving the above-mentioned problem.

According to the present invention, there is also provided, as an engine cylinder head assembling apparatus, an automatic assembling apparatus comprising: cotter supply means for clamping inner and outer diameter portions of a cotter, and holding the cotter at a cotter mounting position of a shaft member; and escaping means for causing a retainer to escape from the cotter mounting position of the shaft member by biasing a spring and a retainer inserted on the shaft member, wherein the cotter and the retainer are assembled to the cotter mounting position of the shaft member by releasing the escaping state of the retainer by the escaping means.

Furthermore, according to the present invention, there is provided a method of clamping inner and outer diameter portions of a cotter, and picking up the cotter from its storage position while maintaining a supply posture to a shaft member when the cotter is supplied to the shaft member.

According to the present invention, there is also provided a method of slidably moving a cotter along a shaft member so as to accurately fit the picked-up cotter on a cotter fitting position on the shaft member.

According to the present invention, there is also provided an automatic assembling method free from an assembling error, wherein a cotter is assembled via a process including an aligning operation of a cotter to be supplied to a shaft member so as to accurately fit the cotter within a space between the shaft member and a retainer.

According to the present invention, there is also provided a method, wherein cotters are picked up from a separate storage state by a separation member, upon holding of the cotters by a finger means, the picked-up cotters are transferred to the finger means while maintaining the separated cotters in the postures in the storage state, and the cotters are simultaneously transferred to a shaft member.

According to the present invention, there is also provided a method, wherein a clamping operation of a cotter is released while applying a biasing force to a finger member, which supplies all of divided members of a cotter to a shaft member, and holds the cotter, when a retainer is returned from an escaping position by the biasing force of a valve spring after the cotter is fitted on a fitting position on a shaft member.

According to the present invention, there is also provided a cotter supply means comprising a member having a function of separating a plurality of cotters in the assembling apparatus comprising the cotter supply means and the retainer escaping means.

According to the present invention, there is also provided a novel arrangement of a cotter storage magazine for transferring divided cotters to the cotter supply means.

There is also provided a method and apparatus, which can eliminate necessity of assembling a frictional clutch as a completed member, and can automatically assemble the frictional clutch in units of parts.

The functions and effects obvious from the following description of the embodiment taken in conjunction with the accompanying drawings are included in the present invention even though they may not be particularly specified.

DESCRIPTION OF THE PREFERRED EMBODIMENTS

Figure 1:
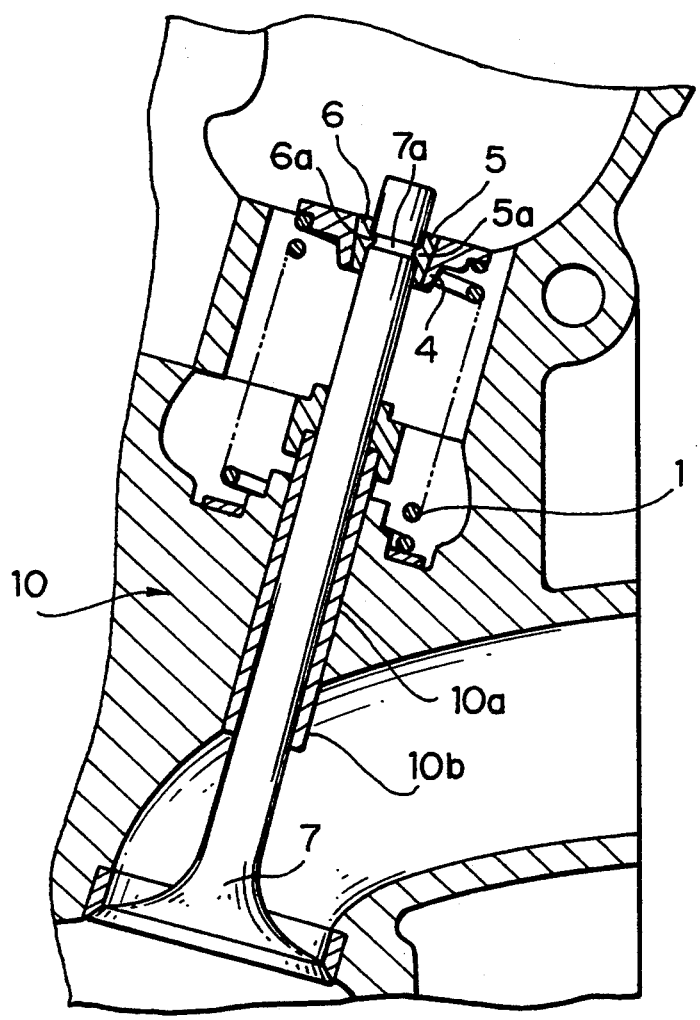
FIG. 1 is a sectional view showing main part around a valve of a cylinder head of an engine.
Figure 2:
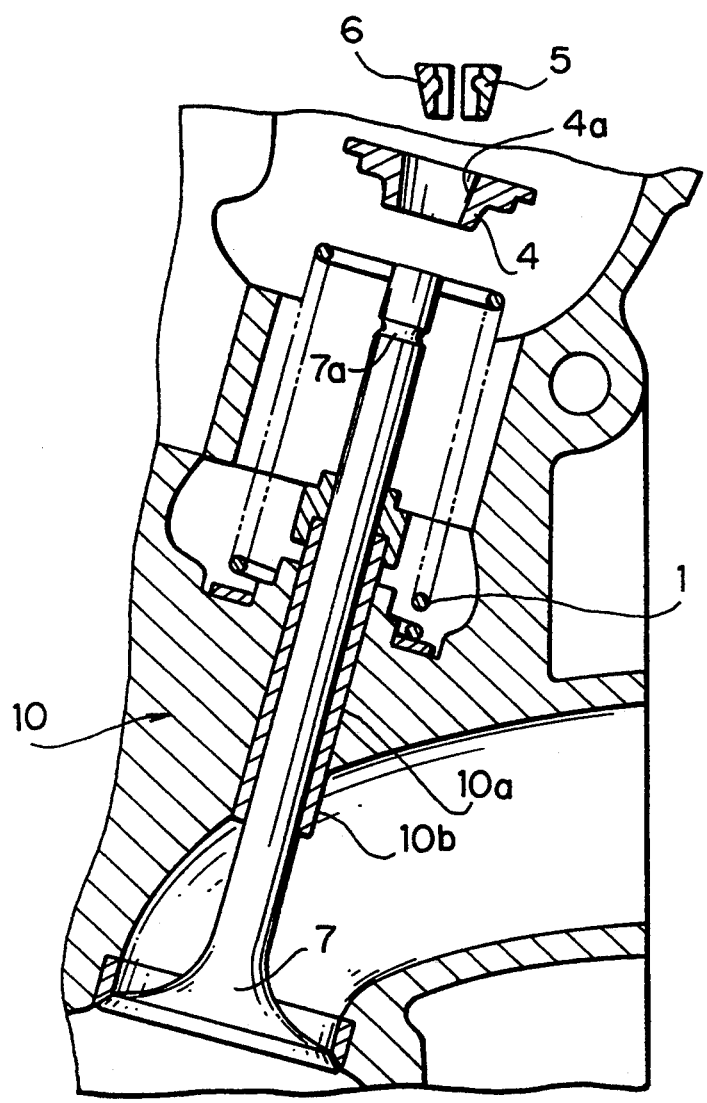
FIG. 2 is a sectional view showing an assembling state of main parts of the cylinder head.
Figure 3:
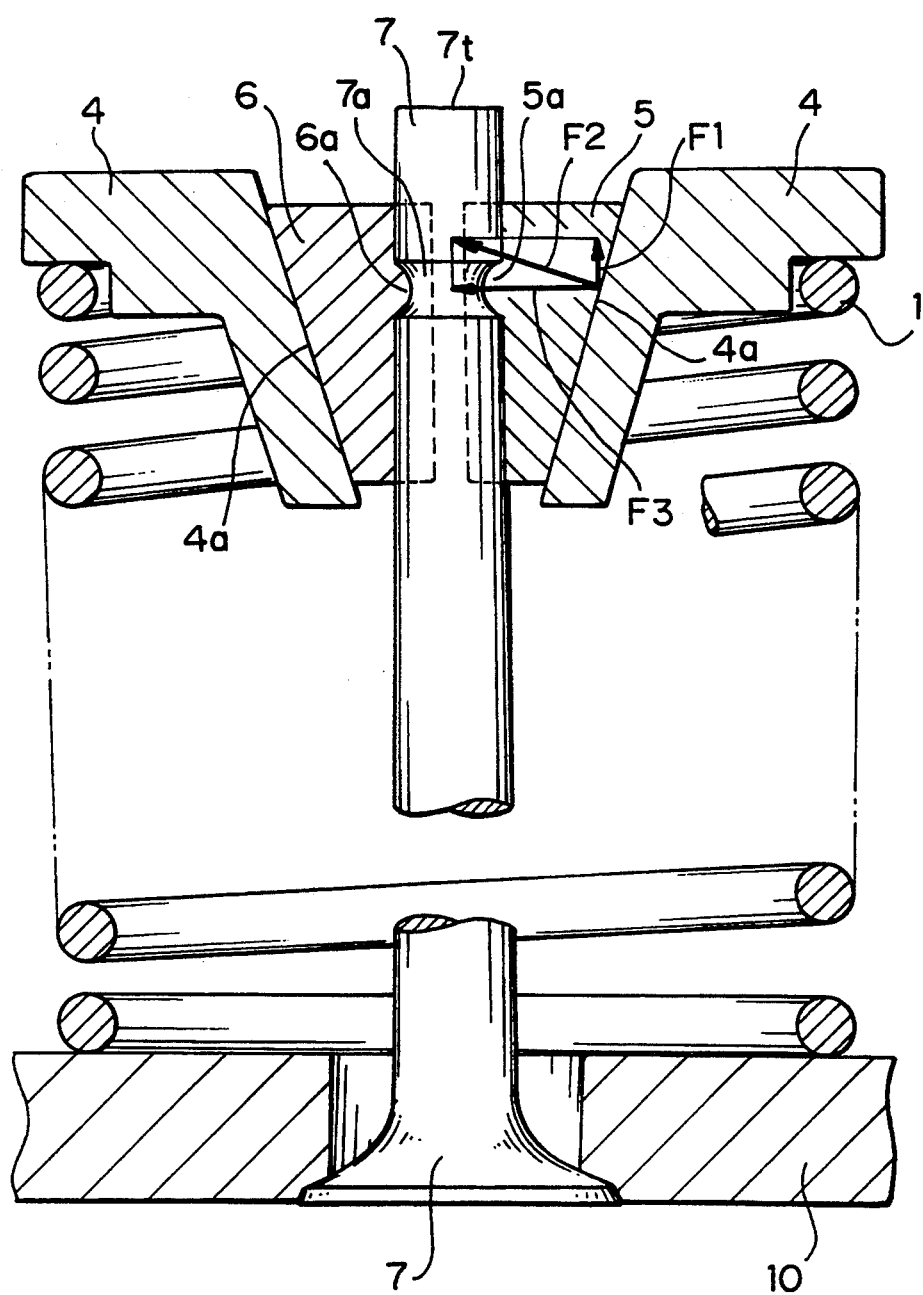
FIG. 3 is an explanatory view of an operation of a cotter.

The preferred embodiments of the present invention, i.e., assembling of an engine head block, and assembling of a frictional clutch to a paper feed mechanism in OA equipment, will be described hereinafter with reference to the accompanying drawings. Note that the same reference numerals denote the same parts throughout the drawings.

In the first embodiment, an automatic assembling method for parts around each valve of a cylinder head of an engine, in which a retainer is inserted on a valve shaft of an engine head block, and a cotter is assembled to a space between the retainer and the valve shaft against the biasing force of a valve spring, is disclosed. More specifically, the assembling method is characterized in that the cotter is held in a supply posture position to the valve shaft, the retainer is held at a position escaped from a cotter fitting position of the valve shaft against the biasing force of the valve spring, the cotter in the supply posture state is then supplied to a cotter assembling position of the valve shaft, and the retainer is moved to the cotter assembling position by releasing the biasing force of the valve spring. In this embodiment, a case will be described below wherein two valves are assembled to each cylinder of an engine head block 10.

Overall Arrangement

Figure 4:
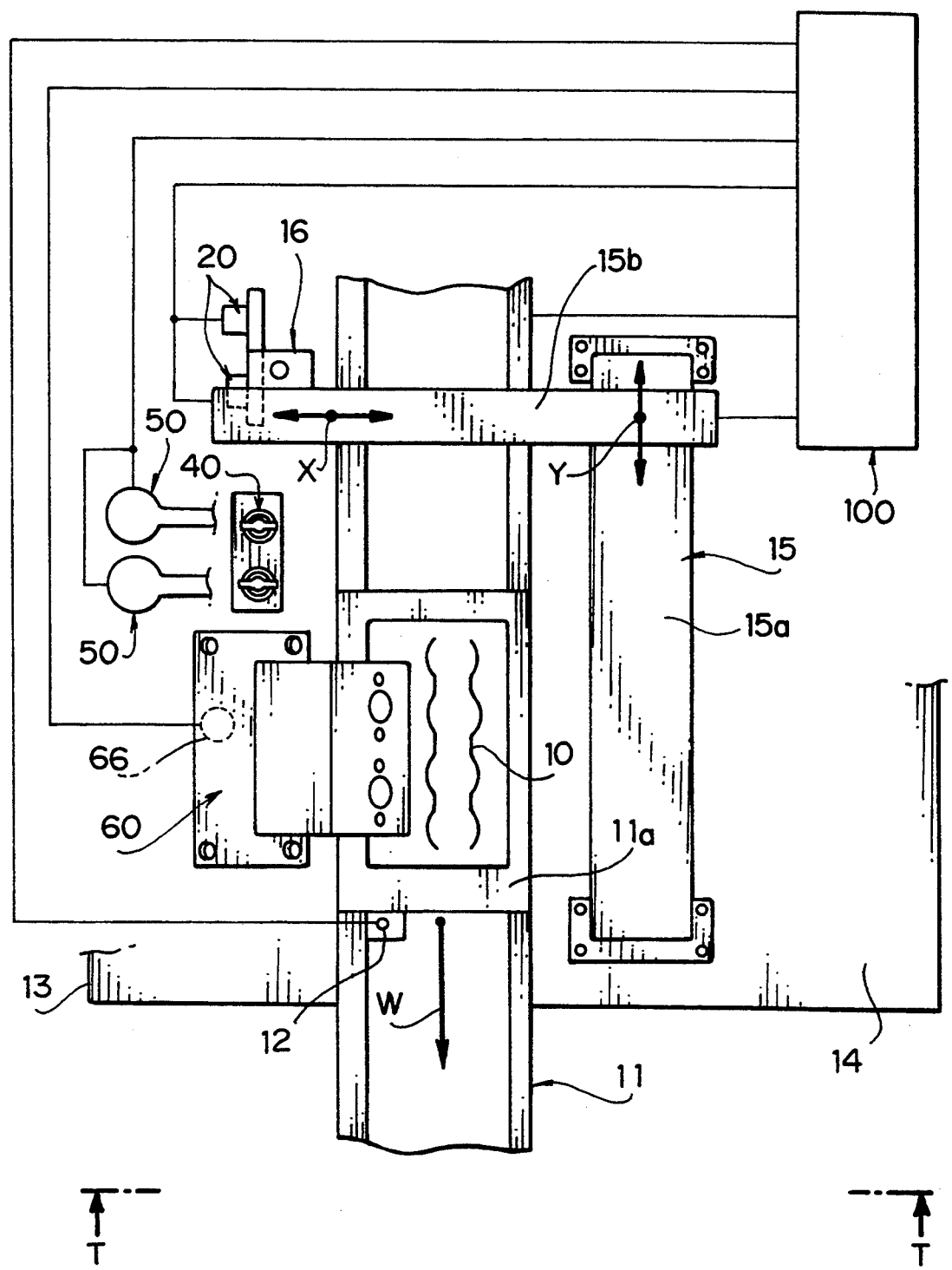
FIG. 4 is a plan view of the overall apparatus.
Figure 5:
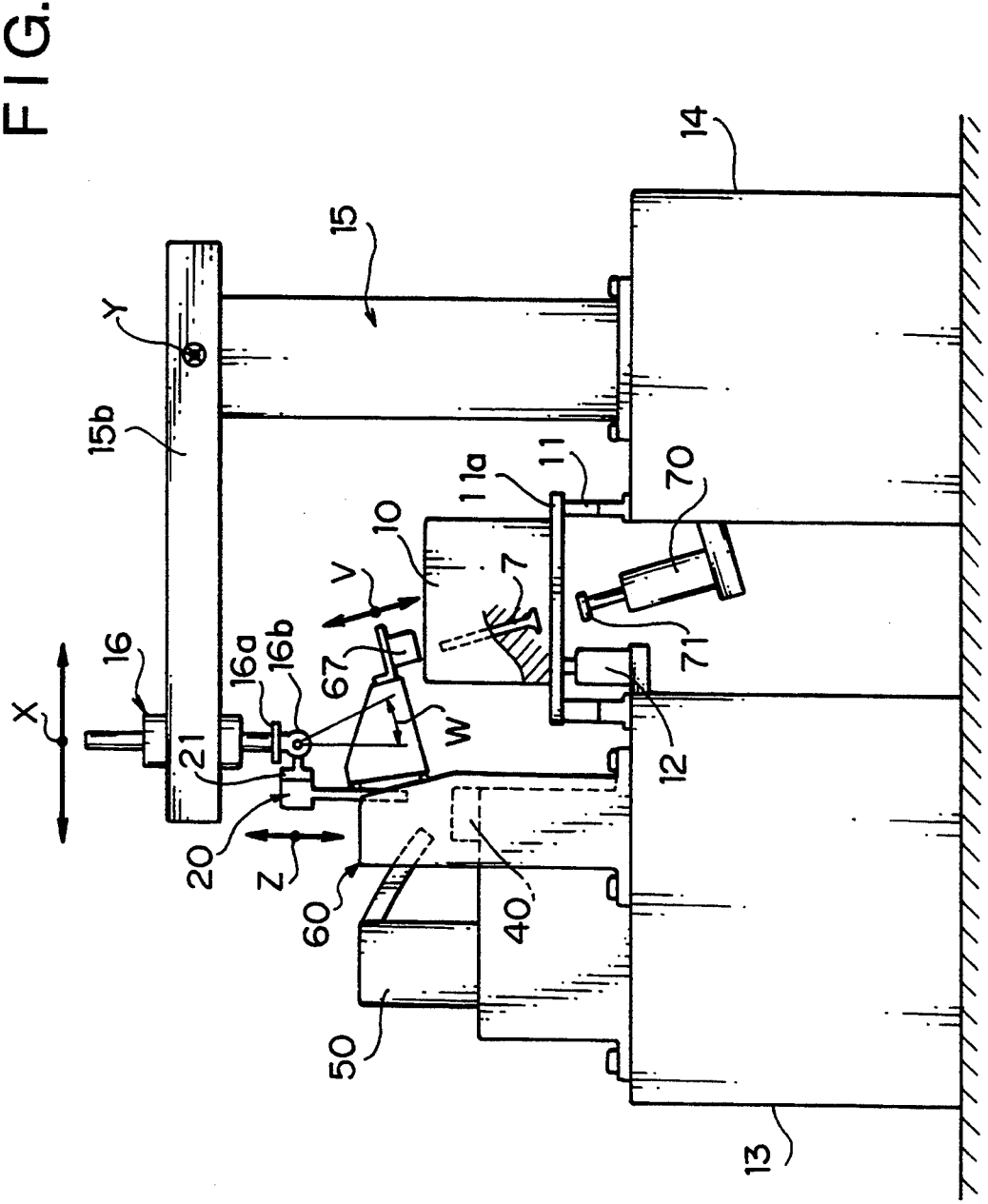
FIG. 5 is a front view when viewed from a direction of an arrow T in FIG. 4.

FIG. 4 is a plan view of an assembling apparatus, and FIG. 5 is a front view when the assembling apparatus is viewed from a direction of an arrow T in FIG. 4. In FIGS. 4 and 5, an engine head block 10 is placed on a carrier 11a, which is conveyed on a conveyor 11 toward a downstream side, i.e., in a direction of an arrow W in FIG. 4, and is continuously conveyed from a previous process. An aligning device 12 for aligning the carrier 11a to a predetermined position is arranged midway along the conveyor 11, and fixes the carrier 11a at the predetermined position.

A retainer pressing device 60 is arranged above the carrier 11a, which is aligned and fixed as described above. The retainer pressing device 60 is a mechanism, which is moved obliquely upward and downward in directions of a double-headed arrow V in FIG. 5 upon operation of an air cylinder 66 so as to press the above-mentioned retainer against the repulsion force of the valve spring.

A cotter storage magazine 40 for storing cotters 5 and 6 is arranged at the upstream side of the retainer pressing device 60, and receives cotters supplied from a parts feeder 50, which stores a large number of cotters.

An orthogonal robot 15 is arranged aside the conveyor 11 at a side opposite to the retainer pressing device 60 and the cotter storage magazine 40. A Y arm 15a for allowing an X arm 15b to be movable in a direction of an arrow Y along the convey direction of the carrier 11a is arranged, as shown in FIG. 4. A carriage 16, which is movable in a direction of an arrow X in FIG. 4, is arranged on the X arm 15b, so that a finger unit 20 carried on the carriage 16 is movable in the X- and Y-directions. Furthermore, as shown in FIG. 5, a lift device 16a for moving the finger unit 20 in the vertical direction as the Z-direction is incorporated in the carriage 16.

A pivot mechanism 16b is fixed to the lower end portion of the lift device 16a. When the pivot mechanism 16b is pivoted in a direction of an arrow W in FIG. 5, the finger unit 20 is pivoted to an angular position coinciding with the inclination of a valve shaft 7.

The above-mentioned conveyor 11 extends over a space portion sandwiched between right and left work tables 14 and 13 so as to facilitate works of workers, and comprises a valve pressing device 70 in the space portion so as to hold the valve shaft 7 at a predetermined position in a dropping prevention state.

The devices in the above description are connected to a central control unit 100, and are arranged to cooperate with each other in an order to be described later. The arrangements of the devices as the characteristic features of the present invention will be described below.

Arrangement of Finger Unit 20

Figure 6:
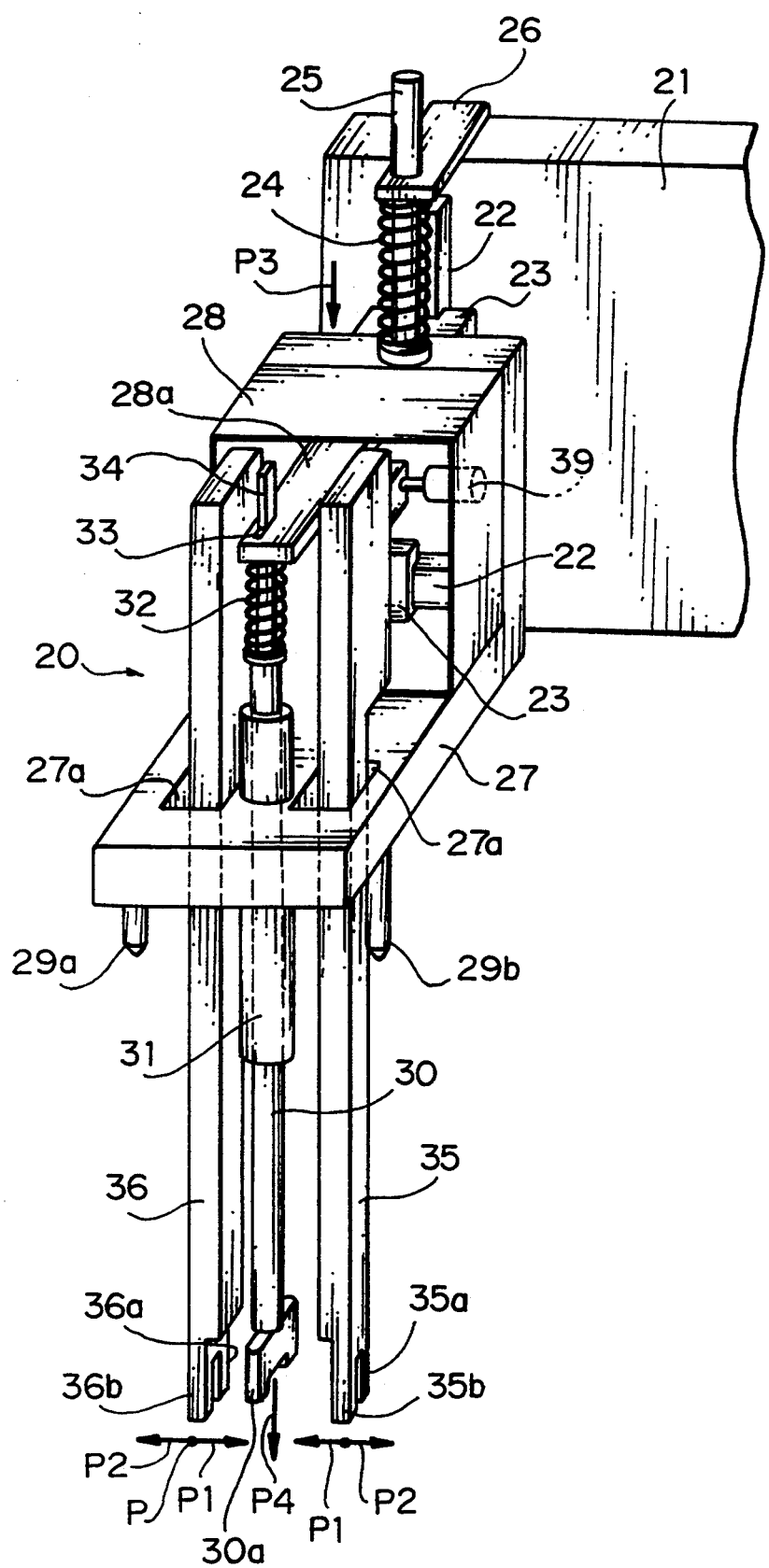
FIG. 6 is a perspective view showing the outer appearance of a finger unit 20.

FIG. 6 is a schematic perspective view showing the outer appearance of the finger unit for picking up the cotters 5 and 6 from the cotter storage magazine 40, and conveying the picked-up cotters into the engine cylinder head.

In FIG. 6, reference numeral 21 denotes a member for mounting the entire finger unit 20 to the above-mentioned pivot mechanism 16b; and 27, an angle member, which allows a guide member 23 to be movable along a guide rail 22 mounted on the member 21. The angle member 27 is always biased downward (in a direction of an arrow P3 in FIG. 6) by a first spring member 24. Reference numeral 25 denotes a spring insertion rod member extending from the upper end of the angle member 27; and 26, a guide member fixed to the mounting member 21. Reference numeral 28 denotes a member for housing a driving mechanism of finger members (to be described below), and attached to the angle member 27. Reference numerals 35 and 36 denote finger members, which extend through via holes 27a and 27b formed in the L-shaped angle member 27.

Reference numeral 22 denotes a guide rail, fixed to the inner side of the housing member 28, for moving the finger members; and 23, a guide member engaged with the guide rail 22, and fixed to the finger members 35 and 36. An air cylinder 39 indicated by a broken line is attached to the housing member 28 so as to open/close the finger member 35 in directions of arrows P1 and P2 in FIG. 6.

On the other hand, a member (air cylinder) for opening/closing the other finger member 36 like in the finger member 35 is housed in the housing member 28 to have substantially the same arrangement as the air cylinder 39. Upon operations of the corresponding air cylinders, the finger members 35 and 36 execute opening/closing operations (the directions of the arrows P1 and P2), thereby grasping the cotters.

More specifically, the distal end portions of the finger members 35 and 36 are formed into a fork shape. Distal ends 35a, 35b, 36a, and 36b of the fork portions are inserted in groove portions 42a, 42b, 41a, and 41b formed on the cotter storage magazine 40 from the above, and grasp cotters stored in the magazine 40 by the opening/closing operations of the finger members in the directions of the arrows P1 and P2.

Reference numeral 30 denotes a cotter guide, which is vertically slidably inserted in a guide cylindrical member 31 mounted on the angle member 27. An upper end 34 of the cotter guide 30 is fitted in a guide hole 33 of a stationary guide member 28a, thus preventing the cotter guide 30 from being rotated. Reference numeral 32 denotes a second spring member for biasing the cotter guide downward (in a direction of an arrow P4 in FIG. 6). Reference numerals 29a and 29b denote guide pins for accurately aligning the retainer pressing device 60 (to be described later) and the finger unit 20.

Description of Cotter Storage Magazine 40

Figure 7:
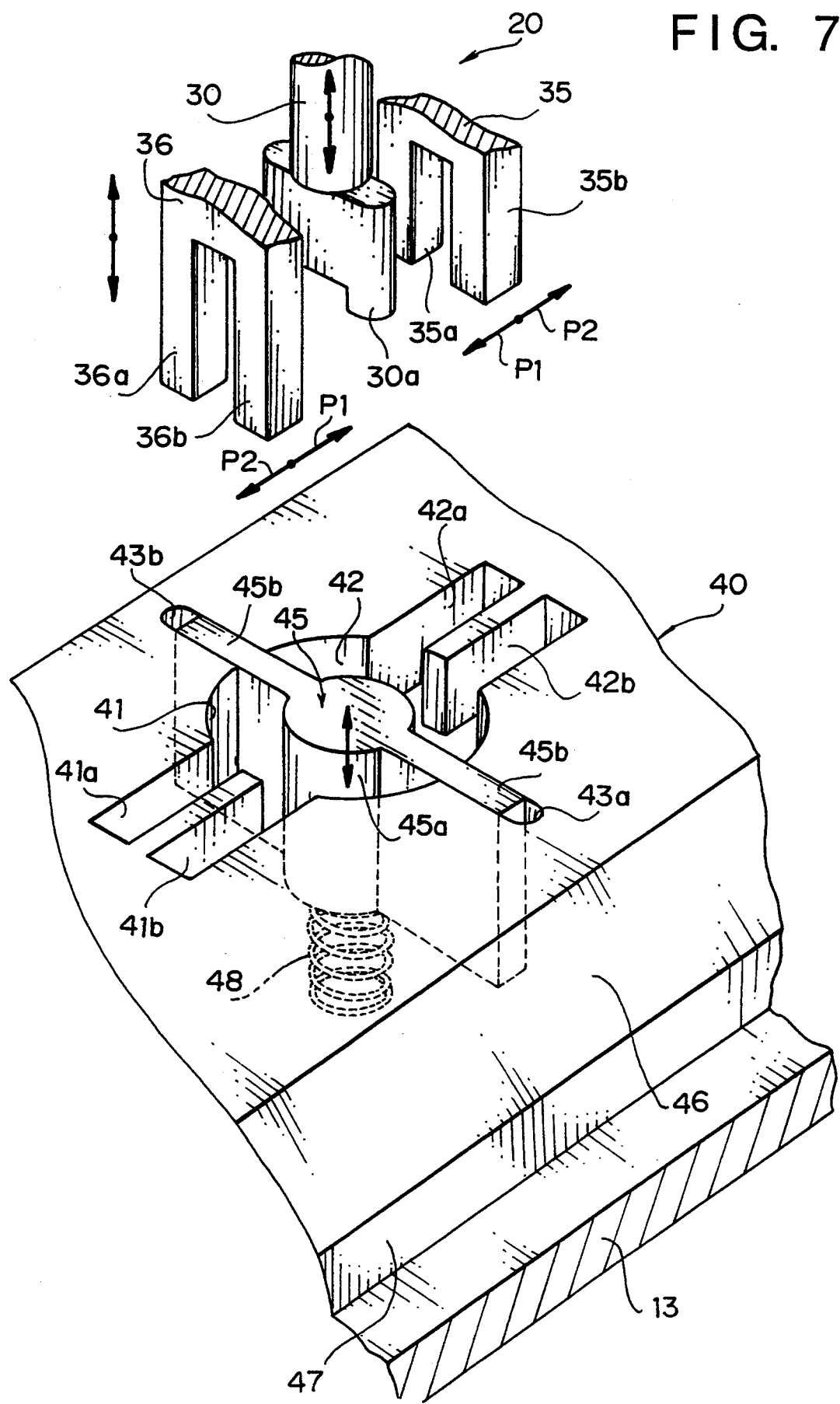
FIG. 7 is a perspective view showing the outer appearance of a cotter storage magazine.

FIG. 7 is a perspective view showing main part of the outer appearance of the cotter storage magazine 40 together with the distal end members of the above-mentioned finger unit 20. In FIG. 7, a base 46 as a foundation of the cotter storage magazine 40 is fixed at a predetermined position on the left work table 13 of the above-mentioned apparatus, and holds a separation bridge 45 between itself and a plate member 47 arranged under the base 46. Central hole portions 41 and 42, and groove portions 42a, 42b, 41a, 41b, 43a, and 43b extending from the circumference of the hole portions in the back-and-forth and right-and-left directions are formed on the base 46, as shown in FIG. 7.

The separation bridge 45 is integrally constituted by a columnar portion 45a having a substantially columnar shape, and guide portions 45b extending from the columnar portion in the back-and-forth direction into the groove portions 43a and 43b. Spaces defined between the separation bridge 45 and the hole portions 42 and 41 of the base 46 serve as storage portions of the cotters 5 and 6. The separation bridge 45 is inserted in the hole portions 41 and 42 of the base 46. In this case, a spring member 48 indicated by a broken line is arranged between the bottom portion of the columnar portion 45a of the separation bridge 45 and the plate member 47. With this arrangement, when cotters are picked up by the above-mentioned finger members 35 and 36, the separation bridge 45 sinks in the hole portions 41 and 42 by the downward pressing force.

In the cotter storage magazine 40 and the finger unit 20 described above, the magazine stores cotters supplied from the parts feeder 50 in the hole portions 42 and 41 formed on the magazine base 46 in a separate state by means of the separation bridge 45. Subsequently, the distal end fork portions of the finger members 35 and 36 of the finger unit 20 can move in the groove portions 42a, 42b, 41a, and 41b of the magazine upon opening/closing operations of the finger members, and the separation bridge 45 sinks by the downward pressing operation of the cotter guide 30.

As a result, when the finger members are driven in the directions of the arrows P1 and P2, the finger unit 20 can grasp the cotters 5 and 6 stored in the storage magazine 40 between a distal end portion 30a of the cotter guide 30 and the finger members 36 and 35.

Description of Retainer Pressing Device 60

Figure 8:
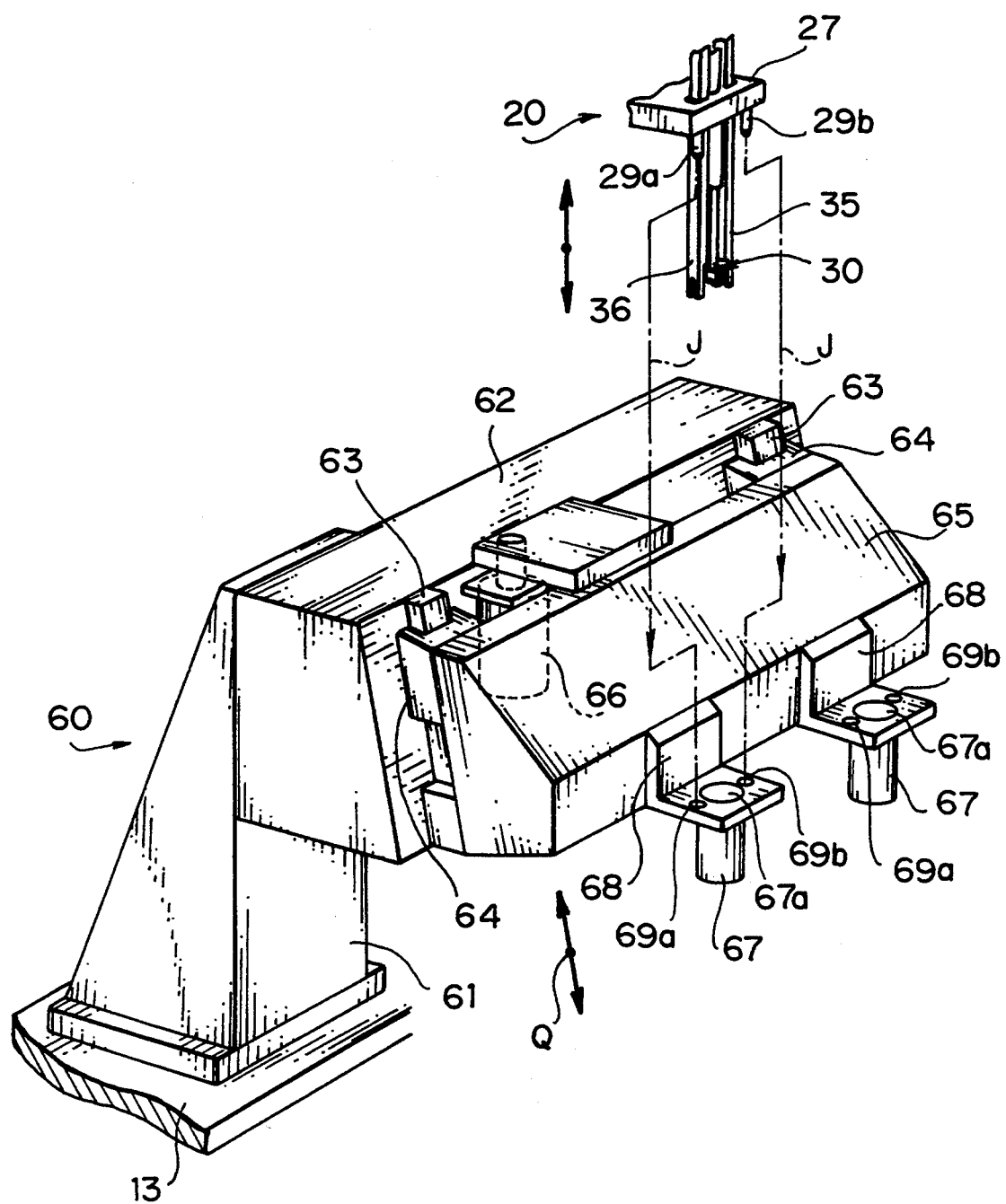
FIG. 8 is a perspective view showing main part of a retainer pressing device 60.

The arrangement of the retainer pressing device 60 for holding a retainer 4 at the upper end portion of the shaft portion of the valve shaft 7 against the compression repulsion force of a valve spring 1 will be described below with reference to the perspective view of FIG. 8. In FIG. 8, the retainer pressing device 60 is fixed on the left work table 13. Reference numerals 61 and 62 denote unit main body block members of a retainer pressing unit; and 65, a movable member, which is movable by an air cylinder 66 in a direction of an arrow Q along a pair of guide members 63 mounted on the horizontal block member 62. Reference numeral 64 denotes receiving members engaged with the guide members 63 and mounted on the movable member side.

Reference numeral 67 denotes two retainer pressing members, which are mounted on the movable member 65 by corresponding mounting members 68. These retainer pressing members 67 have a hollow cylindrical shape. A communication hole formed in each mounting member 68 communicates with an upper opening 67a of the corresponding retainer pressing member 67, and the communication hole 67a has an inner diameter large enough to receive the cotter guide 30 and the finger members 35 and 36 of the above-mentioned finger unit 20.

Each mounting member 68 is formed with hole portions 69a and 69b for receiving the aligning (guide) pins 29a and 29b provided to the above-mentioned finger unit 20 so as to align the cotter guide 30 when the cotter guide 30 is inserted in the corresponding communication hole 67a.

Description of Operation

Figure 9:
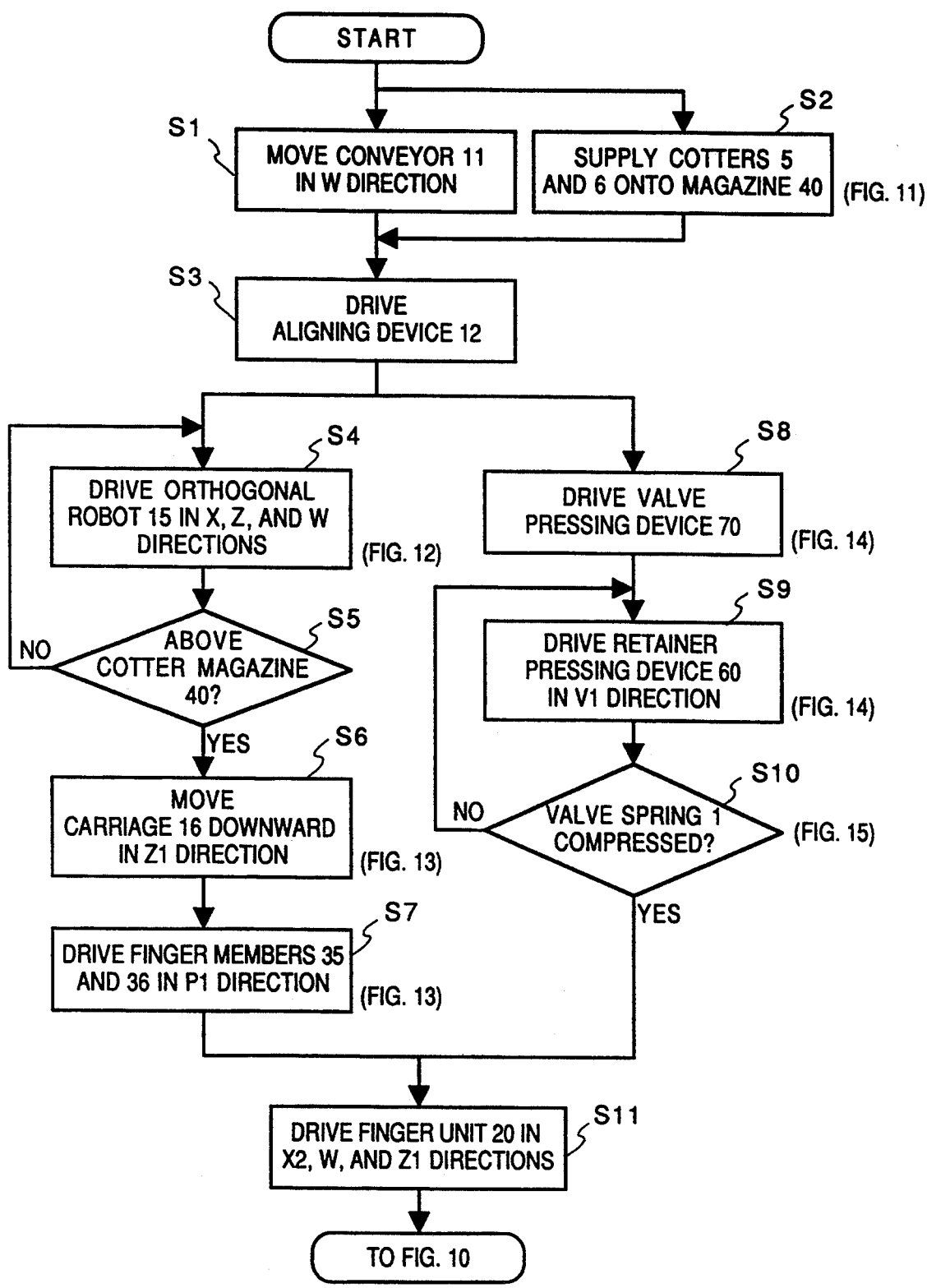
FIGS. 9 and 10 are flow charts for explaining an operation of the apparatus.
Figure 10:
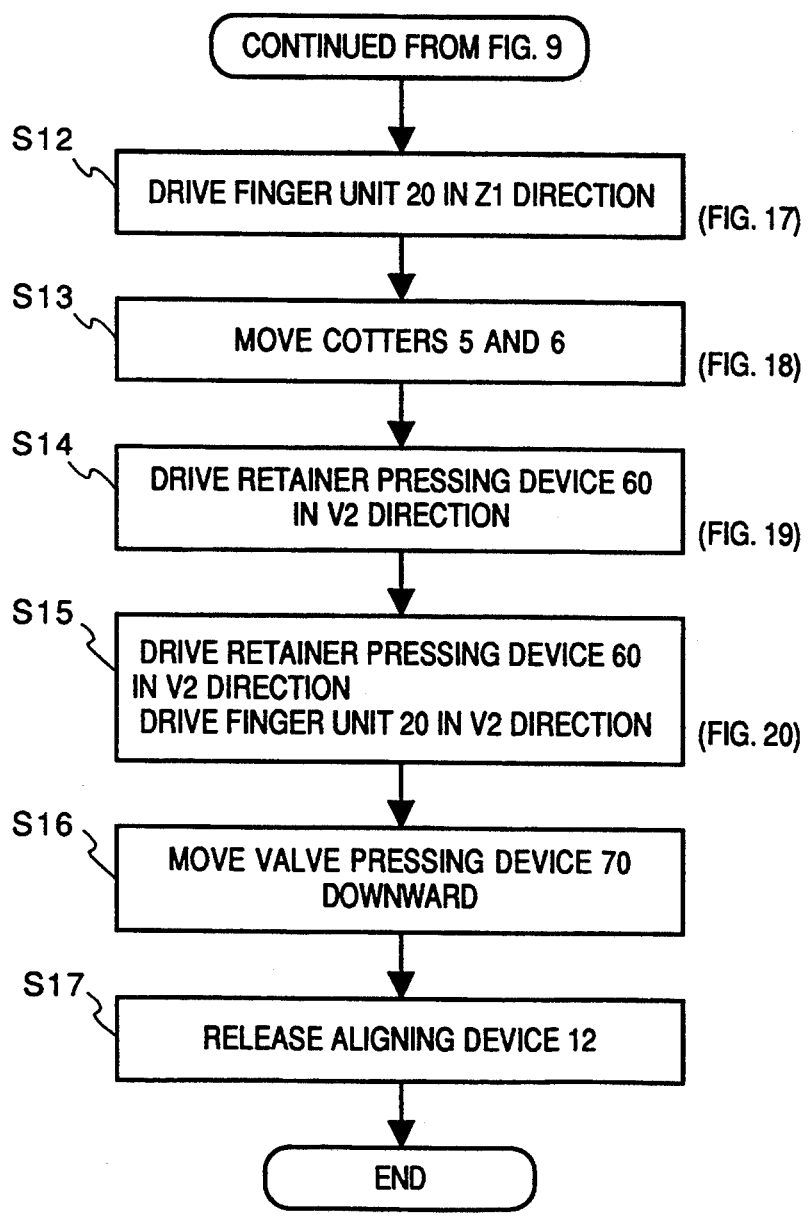

The assembling operation of the apparatus with the above-mentioned arrangement will be described below with reference to the flow charts of FIGS. 9 and 10, and the explanatory views of FIGS. 11 to 20. When a work is started, the central control unit 100 is enabled, and in step S1, the engine head block 10 is conveyed from the previous process upon movement of the conveyor 11 in the direction of the arrow W. Subsequently, in step S3, the aligning device 12 is driven to fix the carrier 11a at a predetermined position.

Figure 11:
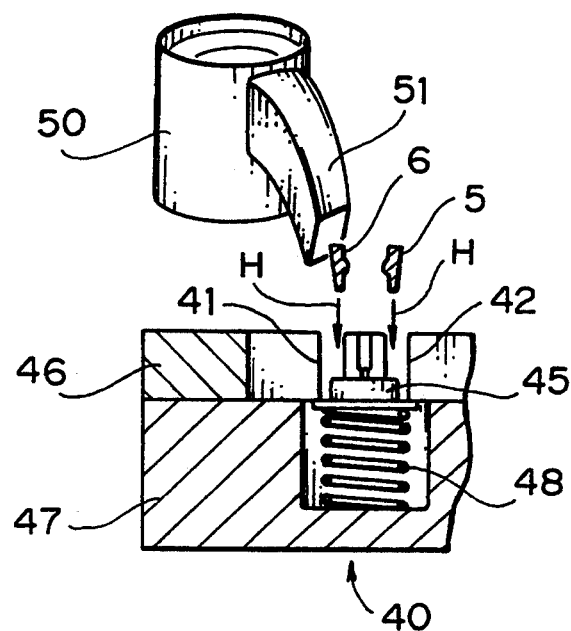
FIGS. 11 to 15 are explanatory views showing the first half of a cotter assembling operation.
Figure 12:
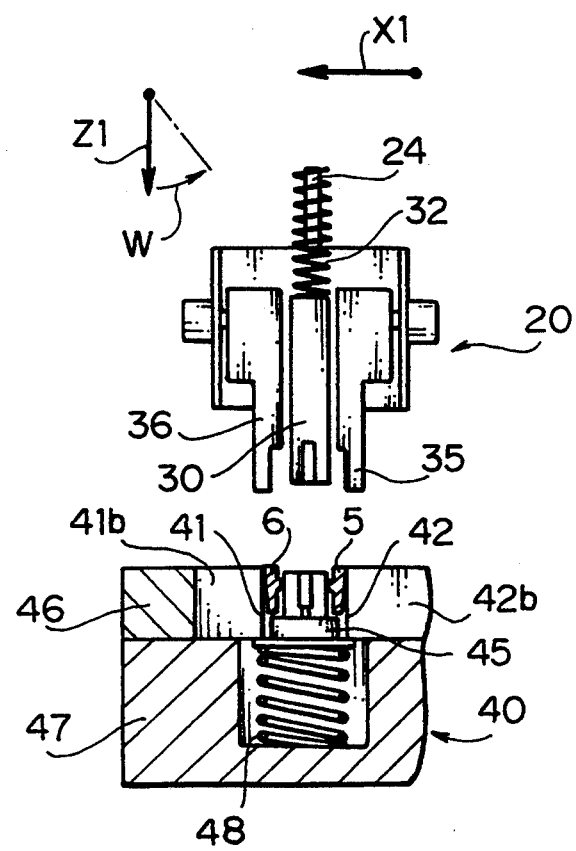

Meanwhile, parallel to step S1, as shown in FIG. 11, the cotters 5 and 6 are automatically supplied from the parts feeder 50 (in a direction of an arrow H), and are set in the predetermined hole portions 41 and 42 in the cotter storage magazine 40 in step S2. Thereafter, the flow advances to step S4, and the orthogonal robot 15 and the pivot mechanism 16b perform predetermined driving operations in directions of arrows X1, Z1, and W, as shown in FIG. 12. It is then checked if the finger unit 20 is moved to a predetermined position above the cotter storage magazine 40 (step S5).

Figure 13:
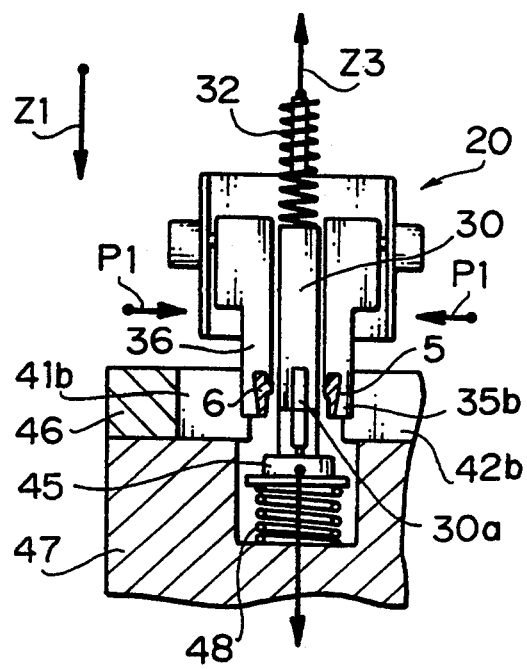
Figure 14:
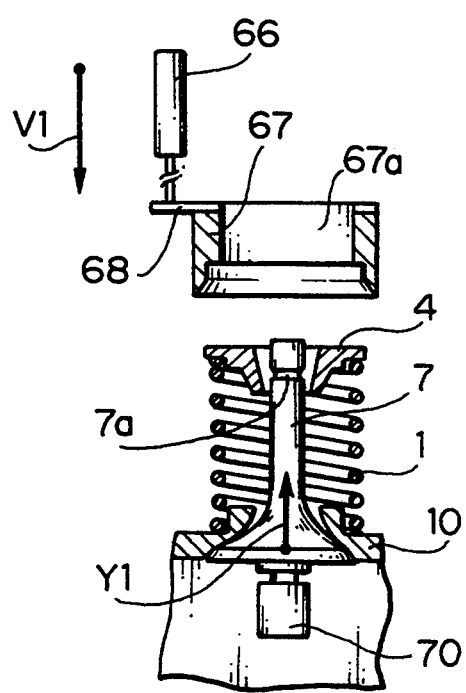
Figure 15:
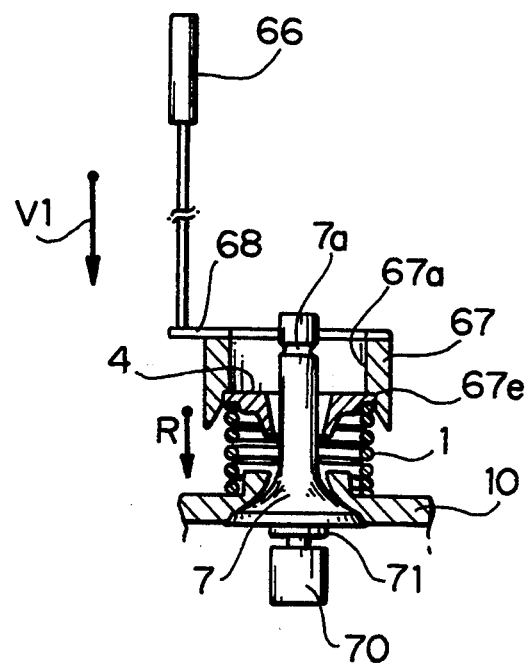
Figure 16:
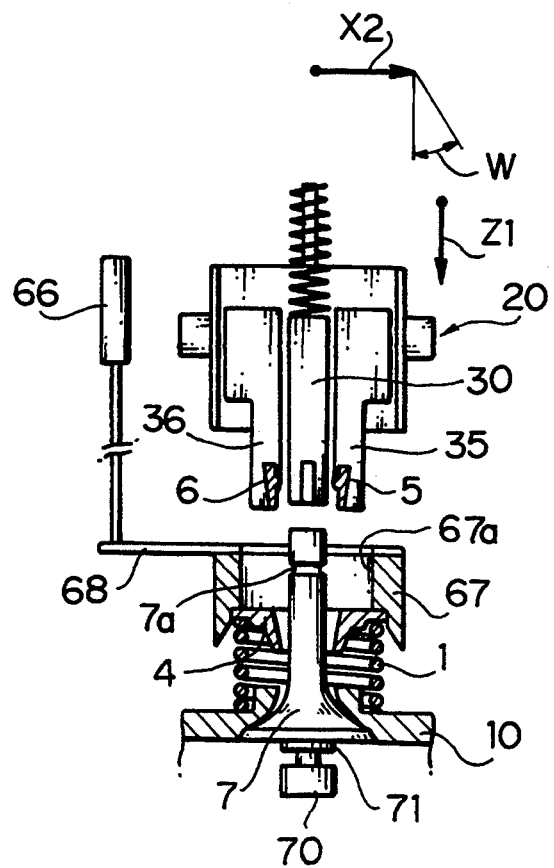
FIGS. 16 to 20 are explanatory views showing the second half of the cotter assembling operation.

In this manner, when it is confirmed that the finger unit 20 has reached the position above the cotter storage magazine 40, the flow advances to step S6, and the finger unit 20 is moved downward (in a direction of an arrow Z1), as shown in FIG. 13. When the downward movement is continued, the lower end face of the cotter guide 30 is brought into contact with the upper surface of the columnar portion 45a of the separation bridge 45 of the magazine 40.

Thereafter, when the downward movement of the finger unit 20 is further continued, the separation bridge 45 sinks in the hole portions 41 and 42 against the biasing force of the spring member 48 while compressing the spring member 48. Parallel to this operation, the fork portions at the distal ends of the finger members 35 and 36 are inserted in the groove portions 42a, 42b, 41a, and 41b of the cotter storage magazine 40. In this case, the biasing force of the spring member 32 for pressing the cotter guide 30 downward is set to be larger than that of the spring member 48 arranged in the cotter storage magazine 40. For example, since the spring member 32 has a biasing force of 600 g, and the spring member 48 has a biasing force of 200 g, the separation bridge 45 is moved downward.

The spring member 24 for biasing the entire finger unit 20 downward is set to have a considerably larger biasing force (e.g., 3,000 g) than those of the spring members 32 and 48.

In this manner, after the finger unit 20 is moved downward to the predetermined position, as shown in FIG. 13, the flow advances to step S7, and the driving operations of the air cylinders 39 are started to drive the finger members 35 and 36 in the direction of the arrow P1. As a result, the cotters 5 and 6 are clamped between the distal end portion 30a of the cotter guide 30 and the distal end portions 35a, 35b, 36a, and 36b of the finger members 35 and 36.

Meanwhile, parallel to step S4, the flow advances to step S8, and the valve pressing device 70 is driven to hold the valve shaft 7 at a predetermined position, and to hold the valve spring 1 and the retainer 4 at an upper end portion of the valve shaft 7. This state corresponds to a natural state of the valve spring 1. In this state, the retainer 4 is merely placed on the spring 1, and a recess portion 7a formed on the valve shaft 7 is closed by the retainer 4, as shown in a preparation state of FIG. 14.

Subsequently, the flow advances to step S9, and the driving operation of the retainer pressing device 60 in the direction of the arrow V1 is started upon operation of the air cylinder 66. Thereafter, the flow advances to step S10, and a moving operation for moving the retainer 4 to a standby position by compressing the valve spring 1 is performed. This operation is stopped at a predetermined position to attain a state shown in FIG. 15.

In this manner, a state wherein the valve shaft 7, the valve spring 1, and the retainer 4 are set in the engine head block 10 is held. For this purpose, each retainer pressing member 67 is moved downward by driving the air cylinder 66, and a retainer engaging portion 67e formed at the distal end portion of the cylindrical inner diameter portion (communication hole) 67a of the pressing member 67 is engaged with the retainer 4. When the retainer pressing member 67 is moved downward to a predetermined position, the valve spring 1 is compressed, and the retainer 4 is kept held at a position escaping from the recess portion 7a of the valve shaft 7, thus attaining the state shown in FIG. 15.

Subsequently, the retainer 4 in the engine head block 10 is kept held at the escaping position by the retainer pressing device 60, and the flow advances to step S11. In step S11, the finger unit 20, which has already picked up and held the cotters 5 and 6, is driven in the directions of the arrows X2 and W. The finger unit 20 is then moved downward in the direction of the arrow Z1 toward the upper end of the valve shaft 7, thus attaining a state shown in FIG. 16.

Upon downward movement of the finger unit 20, the guide pins 29a and 29b are engaged with the aligning holes 69a and 69b provided to the mounting member 68 of the retainer pressing device 60, thereby aligning the cotters 5 and 6 held by the finger unit 20 to the valve shaft 7.

Figure 17:
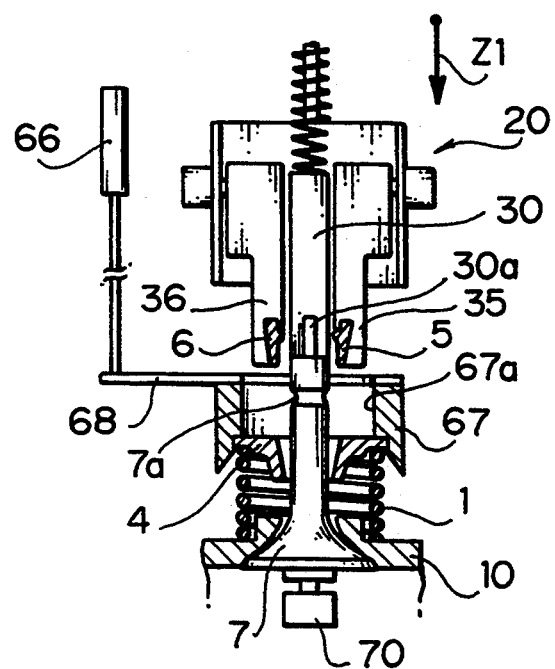

Thereafter, the flow advances to step S12. When the finger unit 20 is continuously moved downward in the direction of the arrow Z1, the cotter guide 30 applies a pressing force onto the valve shaft 7 and is stopped since the spring member 32 for pressing the cotter guide 30 flexes while maintaining the contact state between the cotter guide 30 and the valve shaft 7, as shown in FIG. 17.

Figure 18:
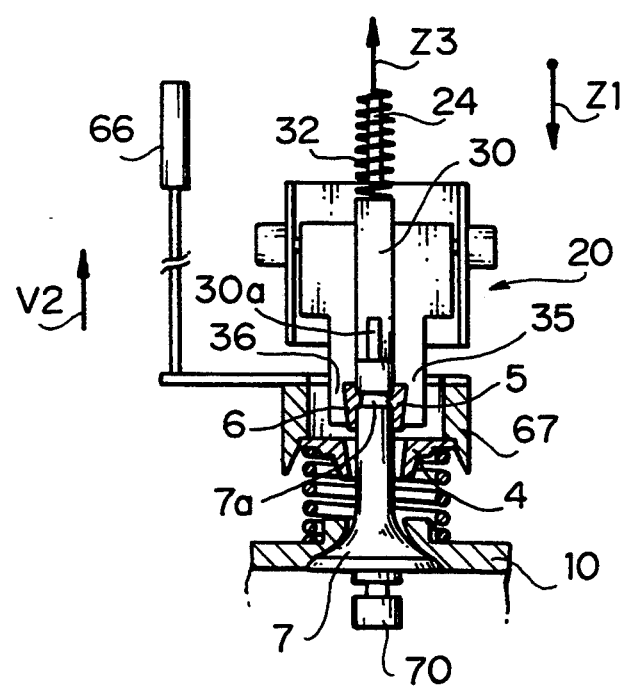
Figure 19:
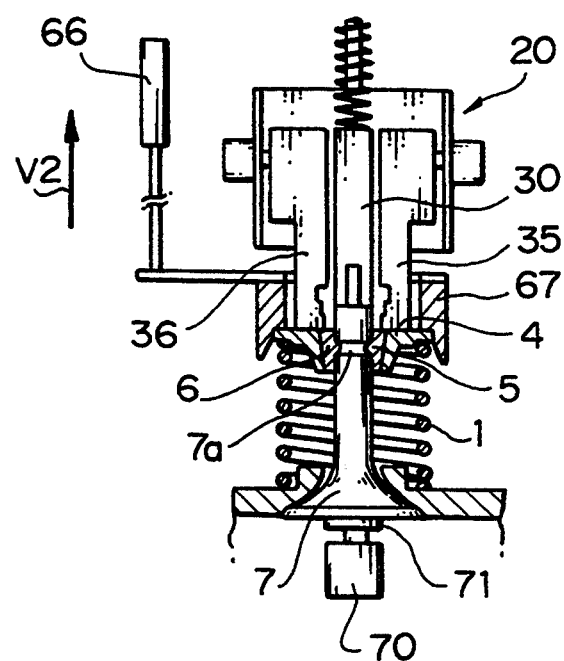

In step S13, as shown in FIG. 18, the finger members 35 and 36 are moved downward according to the downward movement of the unit 20. The cotters 5 and 6 held at the distal ends of the finger members 35 and 36 are then transferred from the cotter guide 30 to the valve shaft 7 side, and are moved from the upper end toward the lower end of the valve shaft 7. The cotters and 6 moving along the valve shaft 7 are stopped when they are engaged with the recess portion 7a formed on the valve shaft 7. In this state, the spring member 24 for biasing the entire finger unit 20 downward does not flex since it has a large biasing force.

The flow then advances to step S14. When the retainer pressing device 60 is moved upward (in a direction of an arrow V2) by releasing the pressing state of the retainer pressing device 60 by the air cylinder 66, the retainer 4 is moved upward by the repulsion force of the valve spring 1, and the upper portion of the retainer 4 is brought into contact with the finger members 35 and 36 upon upward movement of the retainer 4. Thereafter, when the entire finger unit 20 is moved upward along the guide member 23 while flexing the spring member 24, the distal ends of the cotters 5 and 6 are inserted in a space defined between the inner diameter portion of the retainer 4 and the valve shaft 7.

Figure 20:
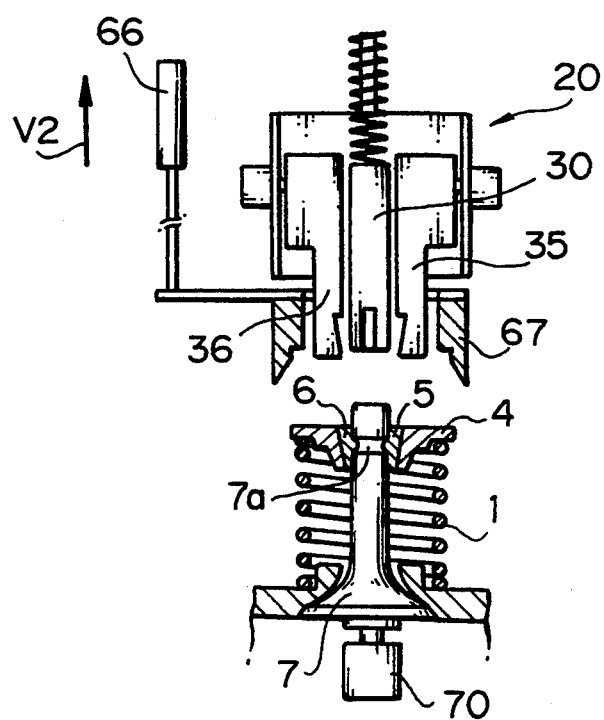

When the retainer 4 is moved upward upon restoration of the valve spring 1, as described above, the cotters 5 and 6 are fitted in the space between the retainer 4 and the valve shaft 7, and the retainer 4 is kept held on the valve shaft by the cotters while maintaining a predetermined biasing force of the valve spring, as shown in FIG. 20. In this manner, since the assembling operation is completed, the flow advances to step S16, and the valve pressing device 70 is moved downward. In step S17, the aligning device 12 is released to prepare for a conveying operation of the engine head block to the next process.

Figure 21:
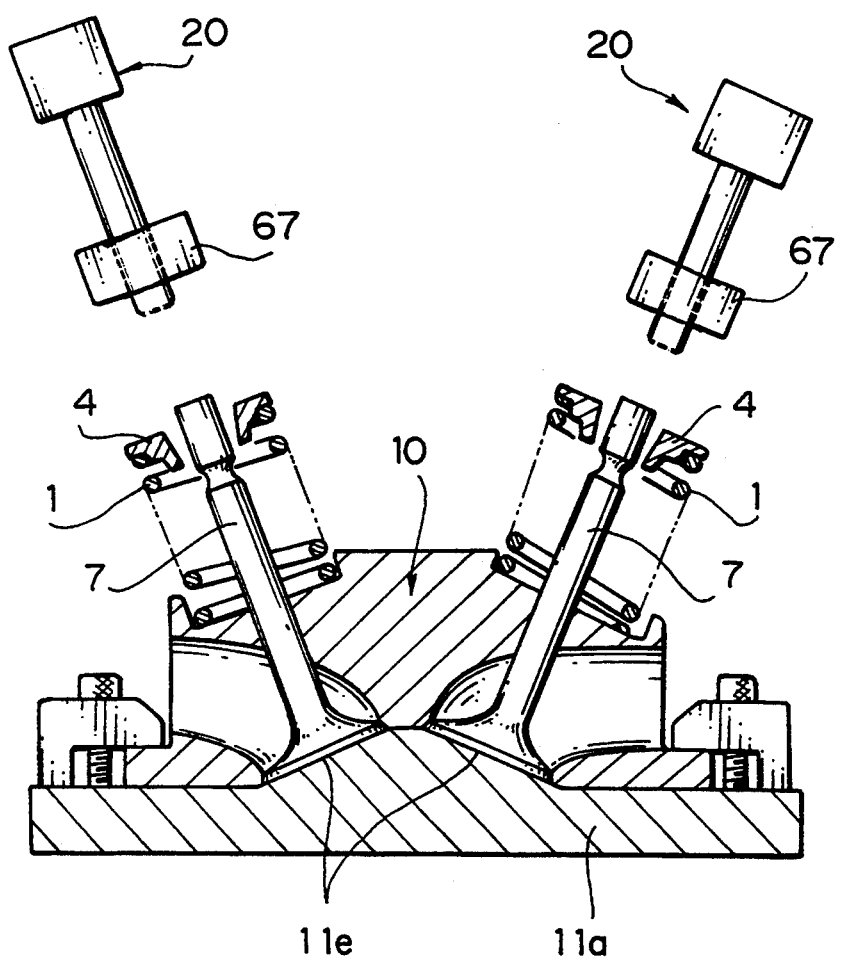
FIG. 21 is a sectional view showing main part of an engine head block.

In the embodiment described above, the special-purpose valve pressing device 70 is arranged below the conveyor 11 so as to hold the valve shaft 7, set in advance in the engine head block 10, at a predetermined position in a dropping prevention state. However, when the engine head block 10 is mounted on and fixed to the carrier 11a, the valve shaft 7 may be set in a dropping prevention state, thus omitting the valve pressing device 70. FIG. 21 is a sectional view showing main part of a state wherein the engine head block 10 is mounted on and fixed to the carrier 11a. In FIG. 21, a projection 11e is formed on the carrier 11a on a portion corresponding to the lower portions of the valve shafts 7. Thus, the carrier 11a can hold the valve shafts 7 at predetermined positions in an illustrated state. When such a carrier 11a is provided, steps S8 and S16 can be omitted, and the processing speed can be further increased. Since each valve shaft 7 is inclined from a horizontal plane in the right-and-left direction, the pivot mechanism 16b is necessary. However, when each valve shaft 7 is provided to be perpendicular to the convey surface of the conveyor 11 as a horizontal plane, the pivot mechanism 16b can be omitted, and the processing time can be shortened by a time required for operating this mechanism.

Another Embodiment

As another embodiment, an arrangement for assembling a frictional clutch to a driving roller in a paper feed mechanism of a copying machine will be described below.

Figure 22:
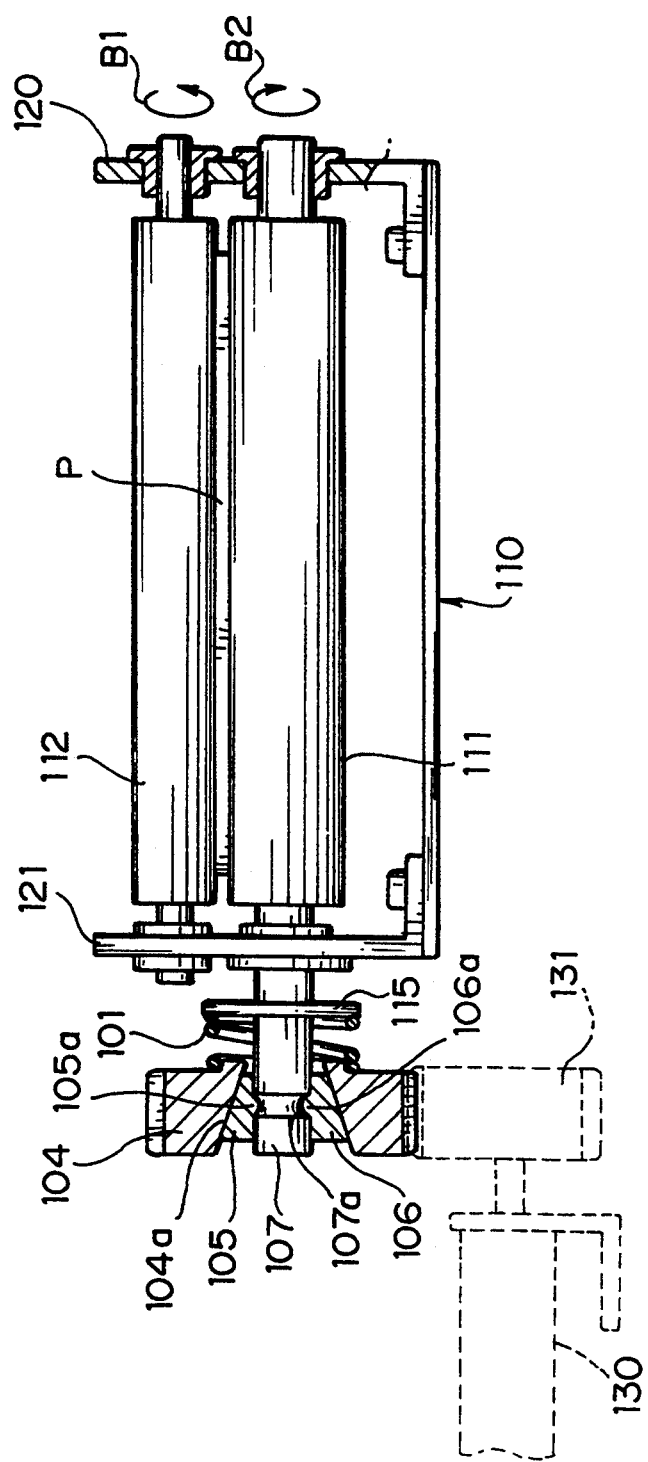
FIG. 22 is a sectional view showing main part of a paper feed mechanism with a frictional clutch.

FIG. 22 is a sectional view showing main part of an arrangement for assembling a frictional clutch to a driving roller in a paper feed mechanism of a copying machine. In FIG. 22, a paper feed mechanism 110 has side plates 121 and 120 provided at two edge portions of a base. Bearings are arranged between these side plates by, e.g., press fitting, to rotatably and axially support rubber rollers 112 and 111. The rubber roller 112 is a driven rubber roller, and the rubber roller 111 is a driving rubber roller. Upon rotation of the driving rubber roller 111, the driven rubber roller 112 is rotated to feed a paper sheet P clamped between these rollers.

The rubber roller 111 has a shaft member 107 as a mandrel. One end of the shaft member 107 projects from the side plate 121 by a predetermined length, and a stop ring 115 is fitted on the projecting portion. A recess portion 107a is formed near the end portion of the shaft member 107 to receive projections 105a and 106b formed on cotters 105 and 106.

A driving gear 131 indicated by a broken line is fixed to the output shaft of a motor 130, and is meshed with a driven gear 104. The motor 130 is assembled as an independent assembly. A tapered surface portion 104a is formed on the driven gear 104, and is brought into contact with tapered surfaces of the cotters 105 and 106 by a biasing force of a compression spring 101, which is arranged between the tapered surface portion 104a and the above-mentioned stop ring 115 to maintain a compressed state, thereby preventing disengagement of the driven gear 104 in the axial direction. A rotational torque is transmitted by a frictional force upon contacting of the tapered surfaces.

With the above-mentioned arrangement, a frictional clutch can be advantageously arranged in addition to fixing of the retainer to the valve shaft member of an engine in the above embodiment. More specifically, when a thick paper sheet or a foreign matter is clamped between the rollers, the rubber rollers or the gears may be damaged, or the motor may be seized. However, since the driven gear 104 and the shaft member 107 are rotatably fixed by the frictional force generated by a contact state between the cotters 105 and 106 and the tapered surface portion 104a of the driven gear 104, and by means of the projections 105a and 106b of the cotters, when an over-load torque acts, the driven gear 104 and the shaft member 107 slip on each other, thus preventing a damage to the mechanical portions.

Figure 23:
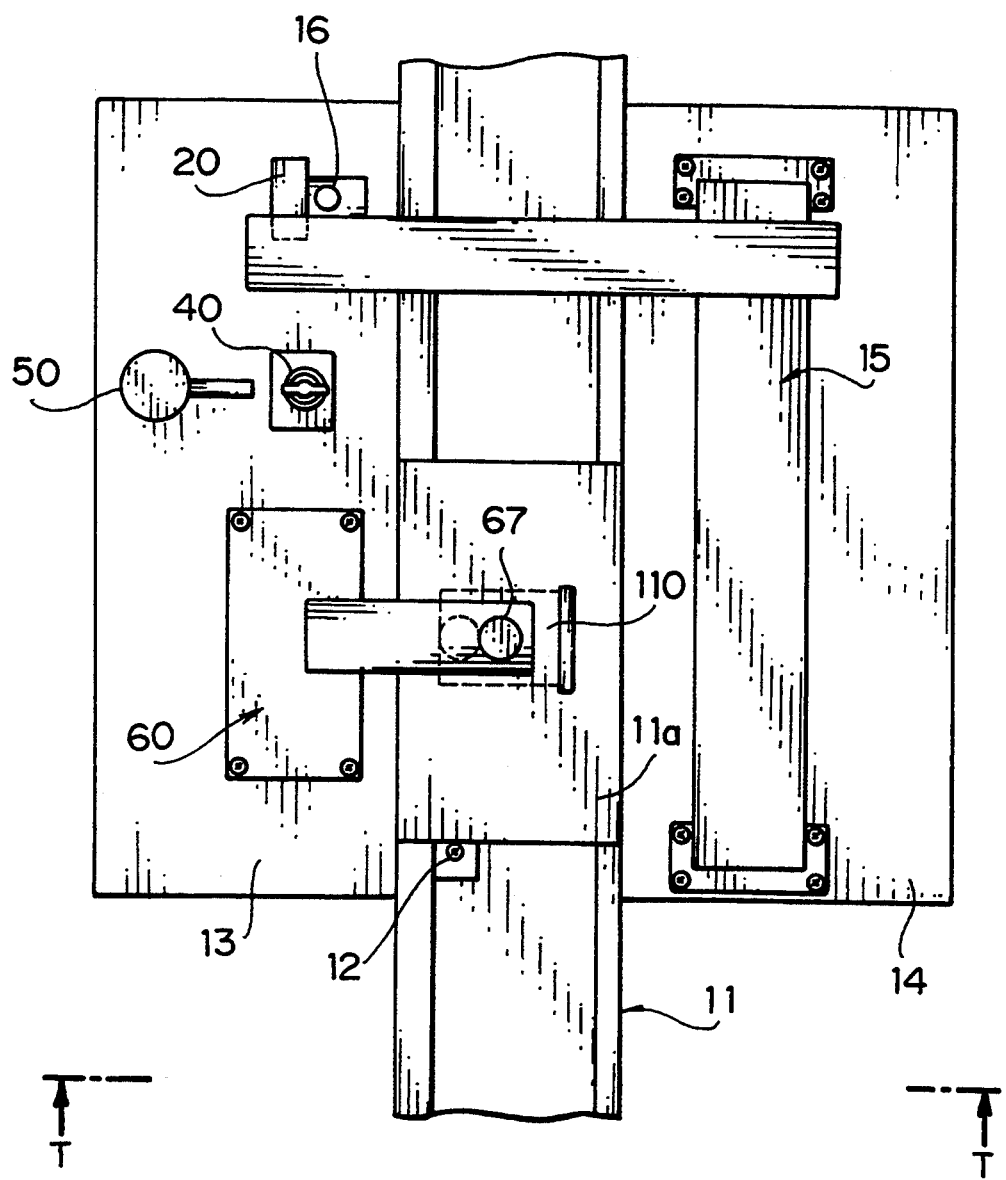
FIG. 23 is a plan view of the overall assembling apparatus for a paper feed mechanism.
Figure 24:
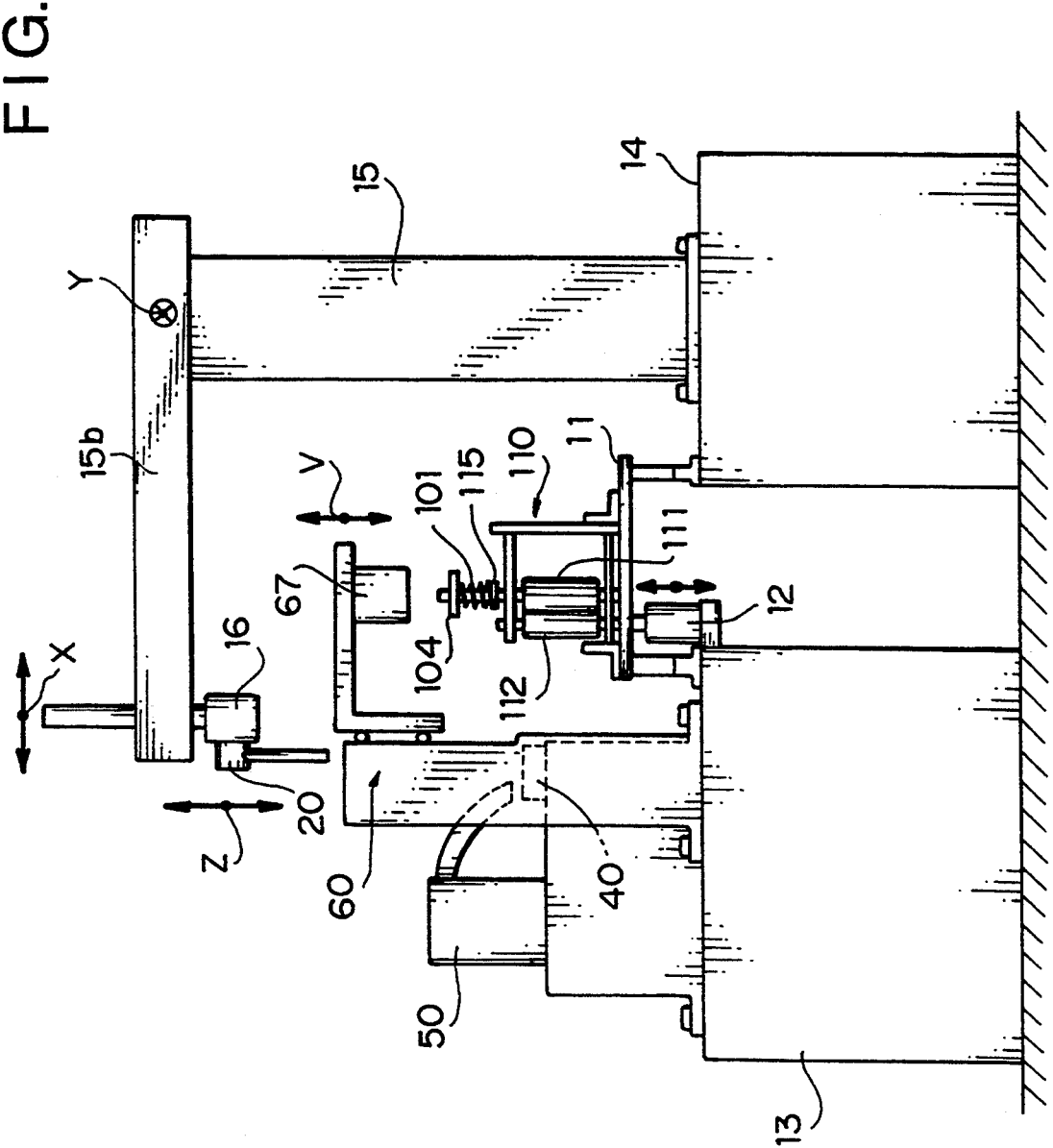
FIG. 24 is a front view when viewed from a direction of an arrow T in FIG. 23.

The assembling method in this arrangement can be the same as the above-mentioned assembling method of parts around the valves of an engine. More specifically, in the following description, the paper feed mechanism 110 can replace the engine head block 10, the driven gear 104 can replace the retainer 4, the compression spring 101 can replace the valve spring 1, and the shaft member 107 can replace the valve shaft 7. FIGS. 23 and 24 show the arrangement of the overall apparatus.

FIG. 23 is a plan view of an assembling apparatus of the paper feed mechanism 110, and FIG. 24 is a front view when the assembling apparatus is viewed from a direction of an arrow T in FIG. 23. In FIGS. 23 and 24, the same reference numerals denote the same parts as in the above embodiment, a detailed description thereof will be omitted, and only an apparatus portion will be described below. Since the paper feed mechanism 110 is set in a semi-assembled state, the valve pressing device 70 is not required. In addition, since the shaft member 107 is substantially perpendicular to the surface of the conveyor 11, the pivot mechanism 16b is not required.

Figure 25:
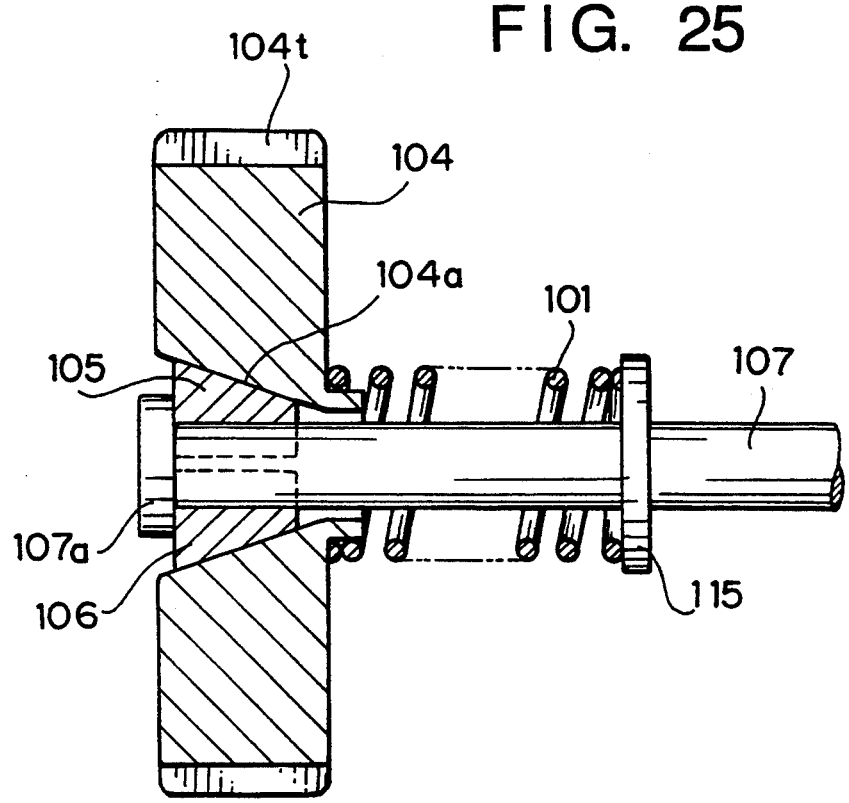
FIGS. 25 and 26 are sectional views showing main part of a paper feed mechanism with a frictional clutch.
Figure 26:
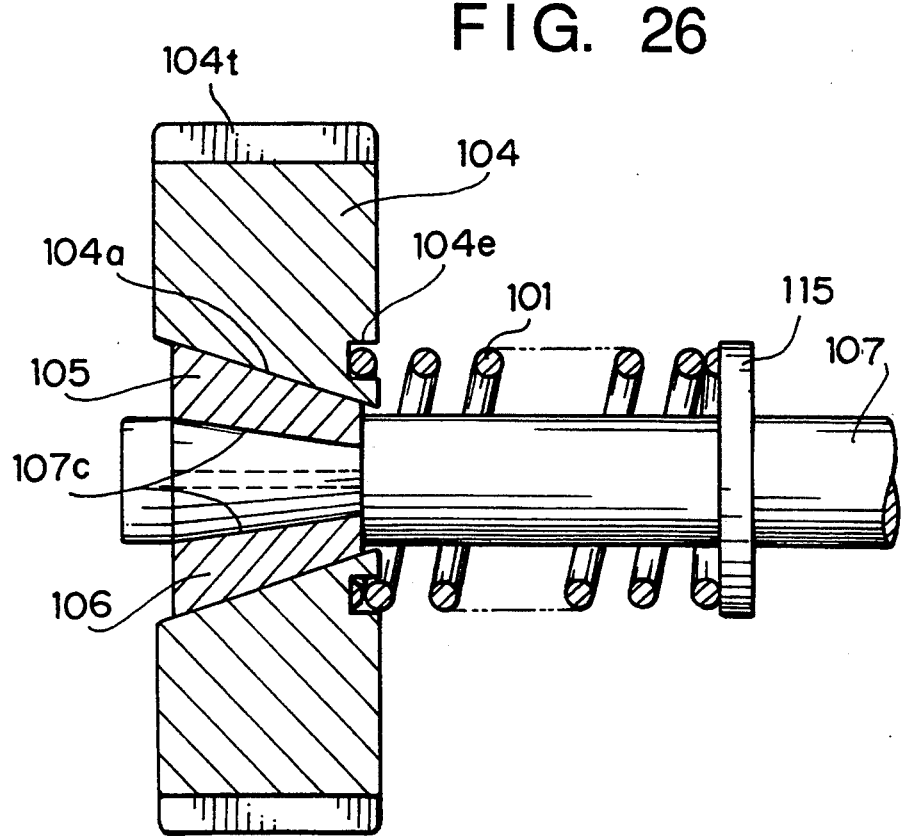

FIGS. 25 and 26 show modifications of the cotters 105 and 106 and the shaft member 107. In FIG. 25, the cotters 105 and 106 may have an illustrated shape having no projections, and disengagement in the axial direction may be prevented by a collar portion 107a of the shaft member 107. In this case, the cotters can be assembled in the same manner as the parts around the valves of the engine.

In FIG. 26, the shaft member 107 has a tapered surface 107c for contacting and fixing the cotters 105 and 106. In this case, since the tapered surface 107c is formed, the contact area is increased, and the cotters can also be stably fixed in the rotational direction. The cotters can be assembled in the same manner as described above. As described above, according to the present invention, a parts assembling work can be realized by substantially full-automated operations. Furthermore, according to the present invention, a plurality of cotters can be moved to a cotter engaging position on the valve shaft since they are slidably moved along the valve shaft upon transferring from the supply position to the valve shaft, thus preventing an assembling operation error.

According to the present invention, since the finger unit and the retainer pressing device are aligned using the aligning pins and the aligning holes in a process before the cotters are transferred from the finger unit to the valve shaft, a position shift between the cotters and the valve shaft can be automatically prevented, thus improving reliability of the assembling work.

Furthermore, according to the present invention, when the cotters are held and transferred to the valve shaft, the cotters are stored in a separate state by the separation member, and when the cotters are picked up by the finger means, the separation member is escaped while maintaining the cotters in the storage postures, and the cotters are then picked up by the finger means, thus improving reliability of the assembling work.

In the assembling apparatus according to the present invention, with the arrangements of the cotter storage magazine and the finger unit, the cotters can be picked up and conveyed to an assembling position while holding them in their supply postures to the valve shaft, thus improving reliability of the assembling work.

In addition, automatic assembling of the paper feed mechanism having the frictional clutch on the shaft member is realized. Therefore, since members constituting the frictional clutch can be directly assembled to the shaft member, the number of steps can be decreased as compared to that of conventional processes wherein the frictional clutch is used as a completed product, and is fixed to the shaft member using screws.

The present invention is not limited to the above embodiments, and may be applied to various other industrial and OA machines which use cotters.

What is claimed is:

1. A cotter assembling method for assembling a shaft member slidably or pivotally arranged on a main body that is conveyed continuously along an assembly line, a compression spring for causing the shaft member to perform a predetermined operation, a retainer for holding the compression spring in a compressed state, and a pair of cotters for setting the retainer in a holding state with respect to the shaft member, said cotter assembling method comprising the steps of:

holding the cotters in a supply posture state, thereby allowing their assembly to the shaft member;

conveying the cotters to an upper end of the shaft member arranged on the continuously conveyed main body;

displacing the retainer from a cotter fitting position of the shaft member against a force of the compression spring to a displaced position; and assembling the cotters to the shaft member at the cotter fitting position in accordance with a return operation of the retainer by the force of the compression spring.

2. The cotter assembling method according to claim 1, wherein said holding step comprises holding the cotters by clamping inner and outer diameter portions of the cotters.

3. The cotter assembling method according to claim 1, wherein said assembling step comprises automatically aligning the cotters when supplying the cotters to the cotter fitting position of the shaft member in accordance with a return operation of the retainer from the displaced position.

4. The cotter assembling method according to claim 1, wherein said holding step comprises converting the cotters from a storage state wherein a separation member is interposed between the cotters to the supply posture state wherein the separation member is removed from between the cotters.

5. The cotter assembling method according to claim 3, further comprising moving the retainer from the displaced position to the cotter fitting position by the force of the compression spring.

6. The cotter assembling method according to claim 1, wherein in said conveying step and in said assembling step, a pair of cotters is simultaneously transferred and slidably moved.

7. The cotter assembling method according to claim 1, wherein said assembling step comprises releasing the cotters from a holding state in accordance with the return operation of the retainer and applying a biasing force to the means for holding the cotters.

8. The cotter assembling method according to any one of claims 1 to 7 or 18, wherein the main body is a cylinder head of an engine, the shaft member is a valve shaft for each intake/exhaust valve formed in the cylinder head, the compression spring is a valve spring in which the retainer is inserted, and the cotters are assembled to a portion between the retainer and the valve shaft against a biasing force of the valve spring.

9. The cotter assembling method according to claim 2, wherein said assembling step comprises slidably moving the cotters along the shaft member to the cotter fitting position.

10. A cotter assembling method for assembling a frictional clutch to a shaft member, said cotter assembling method comprising the steps of:

supporting the shaft member pivotally and axially with a main body that is a housing;

providing a driven gear to the shaft member as a retainer;

holding a compression spring in a compressed state between the driven gear and a stop ring member of the shaft member; and fitting and assembling cotters against a biasing force of the compression spring between the driven gear and a stopper portion of the shaft member.

11. The cotter assembling method according to claim 10, further comprising the steps of providing a core member of a paper feed rubber roller of a copying machine or the like as the shaft member, and arranging the main body as a paper feed mechanism.

12. The cotter assembling method according to claim 10, further comprising the steps of providing a core member of a paper feed rubber roller as the shaft member, and arranging the main body as a paper feed mechanism.

* * * * *

UNITED STATES PATENT AND TRADEMARK OFFICE
CERTIFICATE OF CORRECTION

PATENT NO. : 5,357,675
DATED : October 25, 1994
INVENTOR(S) : SHOJIRO DANMOTO, ET AL.

It is certified that error appears in the above-indentified patent and that said Letters Patent is hereby corrected as shown below:

Column [54],
    Line TIT, "THE" should be deleted.
Column [56] RC,
    Line USPD, "Karlidou" should read --Kerlidou--.
Column 1,
    Line 2, "THE" should be deleted.
Column 9,
    Line 30, "cotters and 6" should read --cotters 5 and 6--.
Column 11,
    Line 2, "a" should be deleted.
Column 12,
    Line 64, "or 18," should read --or 9,--.

Signed and Sealed this

Fourteenth Day of February, 1995

Attest:

BRUCE LEHMAN

*Attesting Officer*    *Commissioner of Patents and Trademarks*